United States Patent
Cordina et al.

(10) Patent No.: US 7,121,509 B2
(45) Date of Patent: **\*Oct. 17, 2006**

(54) ALERTING SYSTEM FOR AIRCRAFT CREW

(75) Inventors: Joseph L. Cordina, Parker, TX (US); Anthony B. Couzelis, Plano, TX (US)

(73) Assignee: iTex Wireless, Inc., Parker, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/747,770

(22) Filed: Dec. 29, 2003

(65) Prior Publication Data

US 2004/0195449 A1    Oct. 7, 2004

Related U.S. Application Data

(63) Continuation-in-part of application No. 10/017,547, filed on Dec. 14, 2001, now Pat. No. 6,676,078.

(60) Provisional application No. 60/326,085, filed on Sep. 29, 2001.

(51) Int. Cl.
*B64D 47/00* (2006.01)

(52) U.S. Cl. ............... 244/118.5; 340/945; 340/541

(58) Field of Classification Search ............. 244/118.5; 340/945, 541
See application file for complete search history.

(56) References Cited

U.S. PATENT DOCUMENTS

| | | | | |
|---|---|---|---|---|
| 3,704,845 A * | 12/1972 | Ord | ............................. | 244/121 |
| 6,246,320 B1 * | 6/2001 | Monroe | ...................... | 340/506 |
| 6,272,359 B1 * | 8/2001 | Kivela et al. | ............... | 455/567 |
| 6,676,078 B1 * | 1/2004 | Cordina et al. | .......... | 244/118.5 |
| 6,703,946 B1 * | 3/2004 | Flick | .......................... | 340/989 |

OTHER PUBLICATIONS

"About ACARS", http://www.acarsonline.co.uk/aclink/alabout.htm.*

* cited by examiner

*Primary Examiner*—J. Woodrow Eldred
(74) *Attorney, Agent, or Firm*—Michael Diaz

(57) ABSTRACT

A method and system for alerting an aircrew of terrorist activity in a cabin of an aircraft. The system includes a plurality of fobs worn by flight attendants. The system also includes an antenna sending unit (ASU) located within the cabin and a cockpit display unit (CDU) located in the cockpit of the aircraft. When a terrorist situation is detected by a flight attendant, the flight attendant sends an alerting signal to the cockpit by sending a coded signal via the ASU to the CDU. The CDU provides an indicator to the cockpit crew and an alert to each fob. In addition, the CDU sends a test signal to each fob to check the status of each fob.

17 Claims, 5 Drawing Sheets

ALERTING SYSTEM FOR AIRCRAFT CREW

RELATED APPLICATIONS

This application is a continuation-in-part of a U.S. patent application Ser. No. 10/017,547, entitled "SYSTEM AND METHOD FOR ALERTING A COCKPIT CREW OF TERRORIST ACTIVITY," filed Dec. 14, 2001 now U.S. Pat. No. 6,676,078 in the names of Joseph L. Cordina and Anthony B. Couzelis which claims the priority date of Provisional Patent Application Ser. No. 60/326,085 filed Sep. 29, 2001 and is hereby incorporated in its entirety by reference herein.

BACKGROUND OF THE INVENTION

1. Technical Field of the Invention

This invention relates to alerting systems and, more particularly, to a system and method for alerting an aircrew of terrorist activities occurring in a cabin of an aircraft.

2. Description of Related Art

As discussed in patent application Ser. No. 10/017,547 ('547), the threat of terrorism on commercial aircraft has recently increased. '547 provided a system and method for covertly alerting a cockpit crew of a terrorist or other dangerous incidences occurring in the cabin area. Although '547 provided a novel method of alerting the cockpit crew of such disturbances, '547 did not provide a method of informing other cabin crew members of any dangerous situations. Because of the size of today's commercial aircraft, incidences occurring in one section of the cabin may go unnoticed by flight attendants locating in another section of the cabin. '547 only provided an alert to the cockpit crew. A system and method is needed which enables all flight attendants to be informed of a dangerous incident. In addition, the system should provide an alert in such a manner as to not alert or alarm other passengers of the incident. U.S. Pat. No. 6,246,320 to Monroe (Monroe), U.S. Pat. No. 4,630,035 to Stahl et al. (Stahl), and U.S. Pat. No. 6,198,390 to Schlager et al. (Schlager) all disclose various types of alerting devices. However, Monroe, Schlager and Stahl do not teach or suggest a system or method which enables mobile units to covertly alert other mobile units of a dangerous system.

Another problem associated with the carriage of fobs by flight attendants involves the administration and control of such fobs held by flight attendants. With the amount of flights and flight attendants involved within airline operations, it is quite possible that a flight attendant may inadvertently walk off of an aircraft, after the completion of a flight, with the fob still in her possession. The system should provide an alert to both the flight attendant and the cockpit crew that the fob is no longer on the aircraft. Thus, it would be a distinct advantage to have a system and method which provides an alert to all cabin crew members when a dangerous incident is occurring, as well as an alert when a fob carried by a cabin crew member is carried from an aircraft. It is an object of the present invention to provide such a system and method.

SUMMARY OF THE INVENTION

In one aspect, the present invention is a system for alerting an aircrew of a dangerous situation occurring on an aircraft. The system includes a plurality of fobs. Each fob is carried by an authorized person located on the aircraft. The fob is a portable transmitter capable of sending a coded signal. A cockpit display unit (CDU) is provided for receiving signals sent from the transmitting fob. The CDU is located within a cockpit of the aircraft. When one of the authorized persons carrying the fob detects a dangerous situation, he may send a signal from the fob to the CDU. The CDU provides an indicator informing a cockpit crew of the dangerous situation. In addition, the CDU broadcasts an alert signal to the fobs, thereby informing the authorized persons of the dangerous situation.

In another aspect, the present invention is a system for alerting an aircrew of a dangerous situation created by a passenger within a cabin area of an aircraft. The system includes a plurality of fobs, each fob being carried by an authorized person located on the aircraft. The fob is capable of transmitting a plurality of selectable signals. Each selectable signal provides specific information on the dangerous situation within the cabin area. The system also includes a cockpit display unit (CDU) located within a cockpit of the aircraft for receiving signals sent from the transmitting fob. When one of the authorized persons carrying the fob detects a dangerous situation created by a passenger within the cabin area, he selects a selectable signal from the plurality of selectable signals and sends the selected signal from the fob to the CDU. The CDU provides an indicator to a cockpit crew of the dangerous situation and an alert signal to each fob. Each fob provides an alert to each authorized person carrying the fob of the dangerous situation.

In still another aspect, the present invention is a method of alerting an aircrew located in an aircraft of a dangerous activity on the aircraft. The method begins by initializing a plurality of fobs to allow a cockpit display unit (CDU) located within a cockpit of the aircraft to recognize any signals transmitted by each initialized fob. A flight crew member carries a fob during flight of the aircraft. Next, a signal is transmitted from the fob to the CDU. The signal is sent by the flight crew member when detecting a dangerous activity occurring aboard the aircraft. An indication is then display on the CDU to a cockpit crew that a signal was sent from the fob. An alert signal is then broadcasted to all the fobs to indicate that a dangerous activity has occurred aboard the aircraft.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
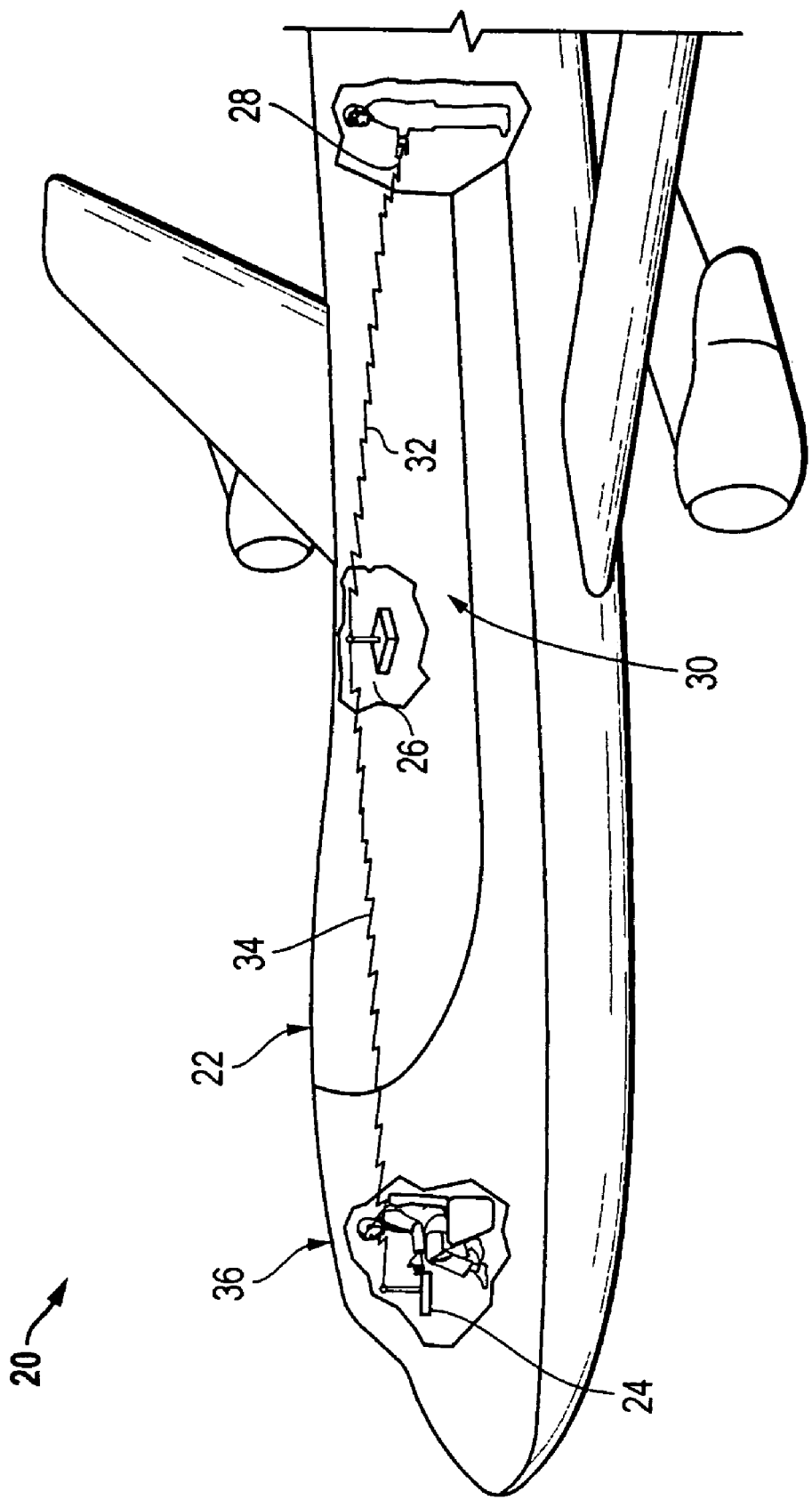
FIG. 1 is a simplified block diagram illustrating the components of an alert system in a preferred embodiment of the present invention.

The present invention is a system and method for alerting cabin crew members of dangerous incidences. FIG. 1 is a simplified block diagram illustrating the components of an alert system 20 in a preferred embodiment of the present invention. The alert system is installed on an aircraft 22 and includes a cockpit display unit (CDU) 24, at least one remote antenna sending unit (ASU) 26, and a plurality of fobs 28.

The plurality of fobs are devices carried by flight attendants within a passenger cabin area 30 and communicate with the ASU via a radio communications link 32. The ASU forwards any signals sent from any fob to the CDU via a radio communications link 34 located within a cockpit 36 where pilots control the aircraft 22. The CDU then provides a visual and aural warning to the cockpit for each received signal. The pilots may then take appropriate action to counteract any terrorist/hijacking attempt occurring on the aircraft. Additionally, the CDU broadcasts, through the ASU, an alert signal to all the fobs located in the aircraft.

Figure 2:
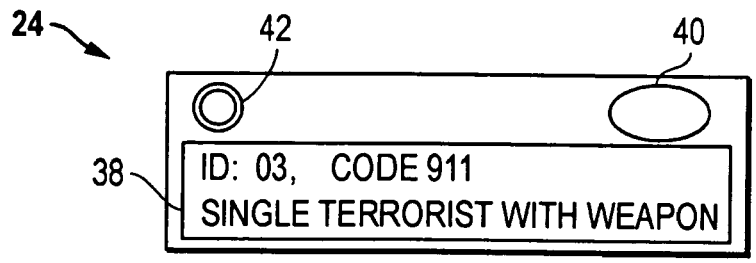
FIG. 2 is a front view of the CDU of FIG. 1 in the preferred embodiment of the present invention.

FIG. 2 is a front view of the CDU 24 of FIG. 1 in the preferred embodiment of the present invention. The CDU is a display unit having a receiver (not shown) for receiving any signals relayed from the ASU 26. Alternatively, the CDU may receive signals transmitted directly from a fob. The CDU is mounted within the cockpit 36 in such a position where the pilots may readily see any visual displays, such as the overhead panel of the cockpit. The CDU includes a visual display 38, a speaker 40, and a test/reset button 42.

The visual display may provide any symbology which may be used by the cockpit crew to indicate potential or actual dangerous situations occurring within the cabin area 30. In the preferred embodiment of the present invention, the visual display is a large, easily readable, backlit LCD having automatic dimming features common in many cockpit instruments. Preferably, the visual display will indicate a textual message for any received signal from the fobs or relayed through the ASU. For example, if an attempted hijacking is occurring, the visual display may indicate the specific fob sending the signal (e.g, "I.D. 03," the code sent (e.g, "911"), and the interpretation of the code (e.g., "single terrorist with weapon"). Additionally, the visual display may incorporate a "message-in-cue" feature which enables the pilot to view multiple messages sequentially by depressing the test/reset button 42.

The CDU 24 also may provide an optional audible alert emitted through the speaker 40. Any signal received from the CDU may actuate the audible alert to inform the pilots that a message is displayed on the visual display 38.

The CDU 24 may also provide a visual or aural display when any signals are detected by the ASU or CDU indicating that jamming or interference is being encountered. Any transmission received over a range near the frequency used by a transmitting fob may be detected through a receiver incorporated within the CDU. The CDU may also provide indications of a fob sending any erroneous unrecognized coded message, such as a nonsensical coded signal, such as may be transmitted by a malfunctioning fob.

In addition, the CDU 24 may also, upon receipt of an alert signal from one fob, broadcast or relay an alert to all the fobs, informing the persons carrying the fobs of any dangerous activity.

The ASU is preferably located within a passenger cabin area 30, however, in alternate embodiments, the ASU may be located anywhere on the aircraft which allows communication with the plurality of fobs and the CDU.

The remote ASU 26 is preferably positioned within the cabin area 30, in such locations as allows reception of any fob's signals. In longer aircraft, such as the Boeing 777, a plurality of ASUs may be required to provide proper coverage of the entire cabin area. The ASU is preferably mounted at the ceiling within the cabin area. However, the ASU may be located anywhere which allows reception of the fobs. The ASU includes a receiver and a transmitter (not shown in FIG. 1). The receiver receives any transmitted signals from any fobs. The transmitter located within the ASU relays the received signals to the CDU 24 via the radio communications link 34.

The ASU, at regular time intervals, also may send out a test signal to each fob. The test signal is received by each fob, which then returns a response signal back to the ASU. If a fob does not receive a test signal from the ASU after a predetermined period of time, the fob may then send an alert to the carrier of the fob. The alert may be an aural alert or a vibrating alert. The test signal is preferably receivable by a fob out to approximately 75 feet. If the fob is carried beyond the 75-foot distance (or any other selected distance), the fob will not receive any test signals. Thus, the use of the test signal acts as an out-of-range alert to the fob carrier. In addition, when the ASU does not receive the response signal from each fob, the ASU relays a "down status" signal to the CDU, informing the CDU of a malfunctioning fob or a missing fob. The down status may indicate that the fob is low on battery power or that the fob has been removed from the aircraft.

Figure 3:
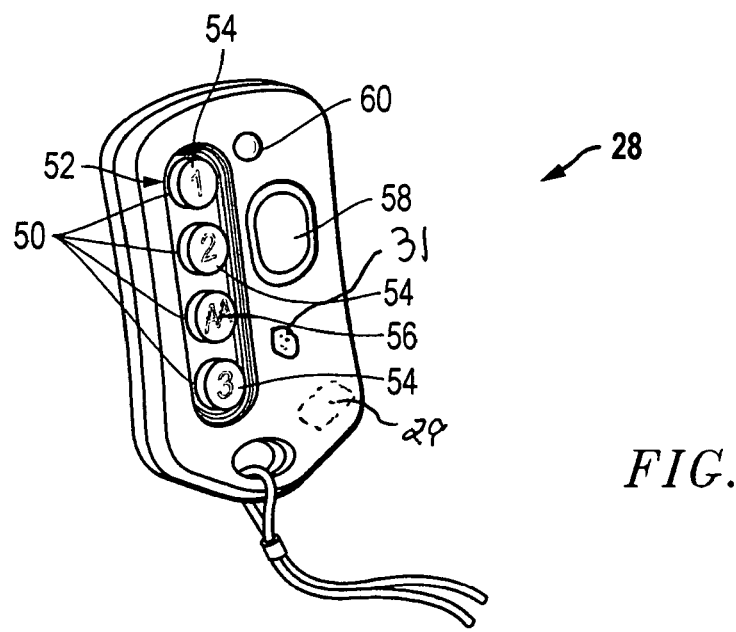
FIG. 3 is a front perspective view of the fob of FIG. 1 in the preferred embodiment of the present invention.

FIG. 3 is a front perspective view of the fob 28 in the preferred embodiment of the present invention. The fob includes five recessed elastomeric buttons 50 to prevent inadvertent actuation of the buttons. In the preferred embodiment of the present invention, the buttons may include four longitudinally arranged buttons 52 illustrating number buttons 54 and a raised emblem button 56. A send button 58 is offset next to the longitudinally arranged buttons. The buttons are configured in such a manner to allow the flight attendant to actuate the buttons without having to view the fob. The fob may also include a bicolored LED 60 to indicate when a valid activation code or transmission has occurred. If any invalid code is transmitted, the LED may indicate a red light, while a valid transmission may provide a green light. In order to transmit an emergency alert to the CDU, a specific sending sequence must be used. For example, the numbers "911" plus the send button must be depressed in the correct order to send an emergency code to the CDU.

The fob 28 may also include a vibrating mechanism 29, commonly used in paging units or mobile phones. In addition, in an alternate embodiment of the present invention, the fob may include a speaker 31 for emitting an aural alert. The vibrating mechanism may be used to inform each fob of an alert sent from another fob. In addition, the vibrating mechanism or the speaker may be used to provide an alert to the carrier that the fob is either out of range of the ASU or is malfunctioning.

The fob 28 may optionally include a staging feature which sends any signal transmitted from the fob in multiple repetitive signals at random spacing to the CDU. This staging feature is employed for use when multiple signals are simultaneous transmitted by different fobs, which, without the staging feature, could possibly result in blocking of one of the fob's sent signals.

Each fob may be initialized with the CDU during preflight, prior to boarding of passengers onto the aircraft 22. The fob may be initialized with the CDU by depressing the emblem button 56 and the send button. The CDU, which is placed in the test mode by depressing the test/reset button, receives a signal from the transmitting fob. The signal sent from the fob may provide data on the specific fob, allowing the CDU to recognize the fob's transmissions. The initialization of the fobs prevents misuse of unauthorized persons utilizing uninitialized fobs or from received fob signals transmitted from other aircraft.

The fob 28 is preferably powered by a small battery, such as a lithium coin cell battery. On a bottom side of the fob, each fob may include a bar code to provide identification of each fob. If the fobs are issued as personal items to each flight attendant, each fob may be associated through a code label upon the fob with a particular flight attendant.

Figure 4:
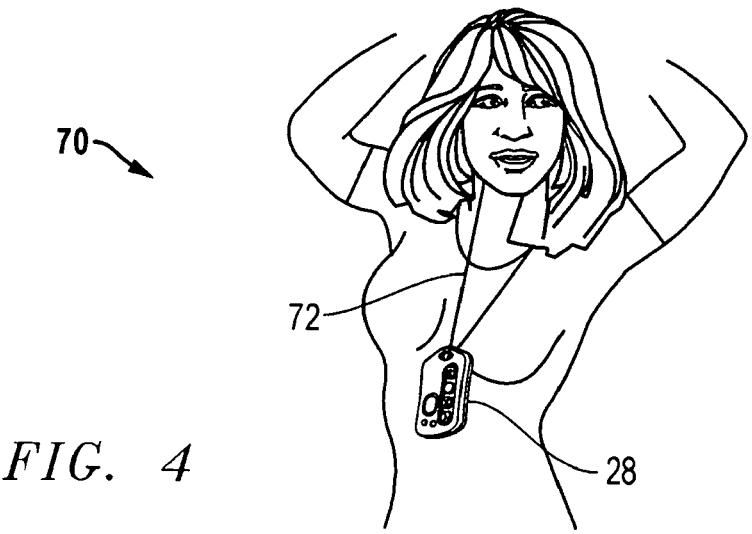
FIG. 4 is a front perspective view of a fob worn by a flight attendant in an alternate embodiment of the present invention.

FIG. 4 is a front perspective view of a fob 28 worn by a flight attendant 70 in an alternate embodiment of the present invention. Preferably, the fob is carried in a pocket of the flight attendant. However, in an alternate embodiment of the present invention, the fob may be carried by the flight attendant by use of a lanyard 72 worn around the neck of the flight attendant. The fob may then be tucked under an apron or shirt of the flight attendant, to partially conceal the fob. The fob's appearance is very innocuous, having the appearance of an ordinary fob used in opening an automobile. However, the fob may be attached or carried by a flight attendant in any manner which allows the flight attendant to immediately actuate the buttons on the fob.

With reference to FIGS. 1–4, the operation of the alert system 20 will now be explained. Depending upon the procedures adopted at each commercial airline using the alert system 20, the fobs may be physically controlled in several different ways. The fobs may be issued prior to each trip (e.g., multiple flying legs accomplished during a single or consecutive days) for which the crew members would receive a fob. The fob may be issued by personnel located at a flight operations center or by a cockpit crew member, such as the aircraft commander. The fobs may alternatively be considered as controlled items issued to each crew member. The crew member would then be responsible for the fob. The fob's correctly assigned crew member could be established by correlating a bar code or serial number located on the back side of the fob. Prior to each flight, each fob is initialized with the CDU 24. The CDU is placed in the initialization mode by depressing the test/reset button 42. Each fob is initialized by depressing the emblem button 56 and the send button 58. The fob sends a specific signal to the CDU identifying the specific fob. The fob's identification is held within the memory of the CDU for a particular length of time, in most cases 12 hours. Therefore, if the flight attendant works the same aircraft 22 on a different flight, the fob does not require re-initialization. However, after the specified time has elapsed, the fob's identity is no longer recognized by the CDU. The dumping from the CDU's memory of the fob's identity automatically removes the fob from memory, thus eliminating the chance that the CDU associates the wrong fob with the aircraft.

Once the fob is initialized, the CDU, through the ASU, is able to accept signals from the initialized fobs. Typically, the fobs transmit a radio frequency (RF) signal (preferably within the 300 to 400 MHz range). However, any type of signal may be utilized which allows the transmission and receipt of coded signals aboard an aircraft. Additionally, the CDU may also receive any extraneous signal sent from an uninitialized fob or a device attempting to jam the RF signal sent from another transmitter unit, such as may be employed by terrorists attempting to jam any signal sent from a flight attendant's fob. The CDU may inform the cockpit crew of such extraneous signals.

In the preferred embodiment of the present invention, the ASU or the CDU may receive any signal received from any initialized fob. During the flight, all flight attendants carry their assigned fobs with them at all times. As discussed above, the fob is preferably carried by the flight attendant. However, the fob may be carried in any fashion which allows quick access to the fob (FIG. 4).

When any behavior for which a flight attendant deems to be hostile or belligerent by a passenger occurs, the flight attendant may then transmit a signal via the fob to the cockpit crew. In the preferred embodiment of the present invention, the flight attendant transmits a specific code for specific circumstances. For example, for a single terrorist aboard the aircraft, the flight attendant may send a "911" to the cockpit 36. If there are multiple terrorists present within the cabin area 30, the flight attendant may send a "912" code. Any code may be used which a flight attendant may easily remember to transmit during dangerous situations. In addition to sending the numeric code, the flight attendant may be required to depress the send button 58.

The ASU 26 receives the signal from the fob via the radio communications link 32 and forwards the signal via the radio communications link 34 to the CDU 24. The CDU may provide a visual indication on the visual display 38. For example, the visual display may indicate the specific fob transmitting a code, the code number, as well as a text message indicating the meaning of the code number (e.g., single terrorist). The radio links between the fob, ASU, and CDU may all be RF transmissions. Additionally, the speaker 40 may emit an aural signal which may be silenced by a push-to-silence button. If multiple signals are received by different fobs, the CDU stores each signal within a memory unit (not shown) integral to the CDU. A cockpit crew member may then depress the test/reset button 42 to display the next message held in cue within the memory unit of the CDU.

Additional, along with providing indicators to the cockpit, if a correctly sequenced code is received by the CDU, the CDU may optionally send an alert signal to all the fobs, thus informing all the flight attendants that an alert has been issued by another crew member. Alternatively, the ASU, upon receipt of the alert signal from the initiating fob, may immediately relay the signal to both the CDU and all other fobs. Upon each fob receiving an alert signal, the fob may vibrate to inform the flight attendants of the dangerous situation.

By determining that terrorist/hijacking attempts are occurring on the specific aircraft, steps can be taken early in the attempt to negate or diminish the damage done by the terrorists. Specifically, within the cabin, flight attendants may covertly provide surveillance of the situation in the cabin without alerting the dangerous individual/individuals.

After initiation of the fobs, at set time intervals, the ASU sends out a test signal to each fob. Upon receipt of the test signal, each fob responses by sending a response signal to the ASU. If the fob does not receive a test signal after a predetermined time period, the fob emits an alert. Since the test signal is only receivable out to a specified range, such as 75 feet, when a fob is carried off the airplane, an out-of-range alert is emitted by the fob. Additionally, the ASU may inform the CDU when any response signals are not received from each fob. Thus, if a fob is malfunctioning or out of range, the response signal is not received by the ASU. The ASU then informs the CDU of any missing response signals. It should be understood that any or all functions performed by the ASU or the CDU may be incorporated or transposed into each other or other units carried onboard the aircraft.

Figure 5A:
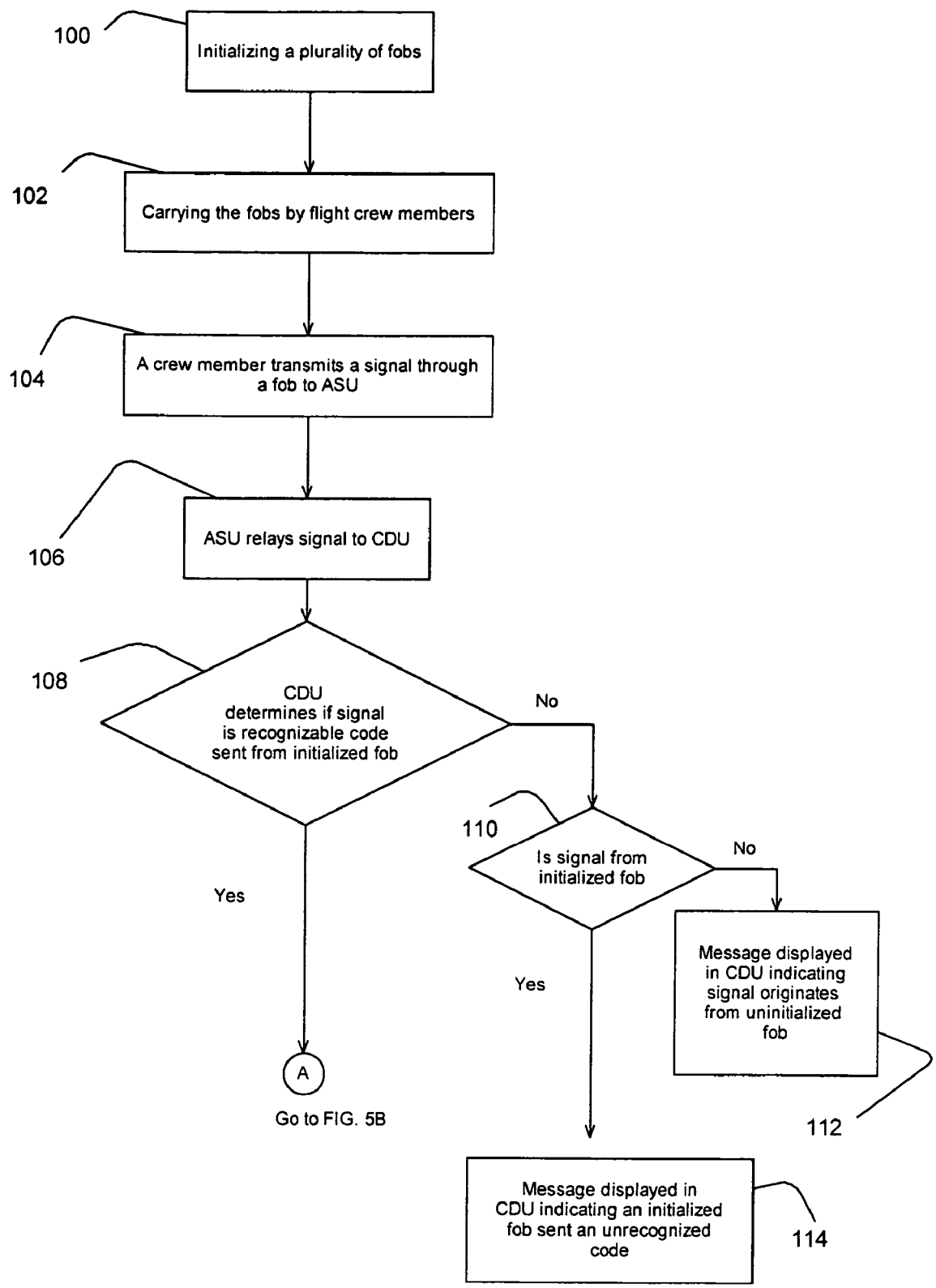
FIGS. 5A and 5B are flow charts outlining the steps for alerting all aircrew of any terrorist activities on the aircraft according to the teachings of the present invention.
Figure 5B:
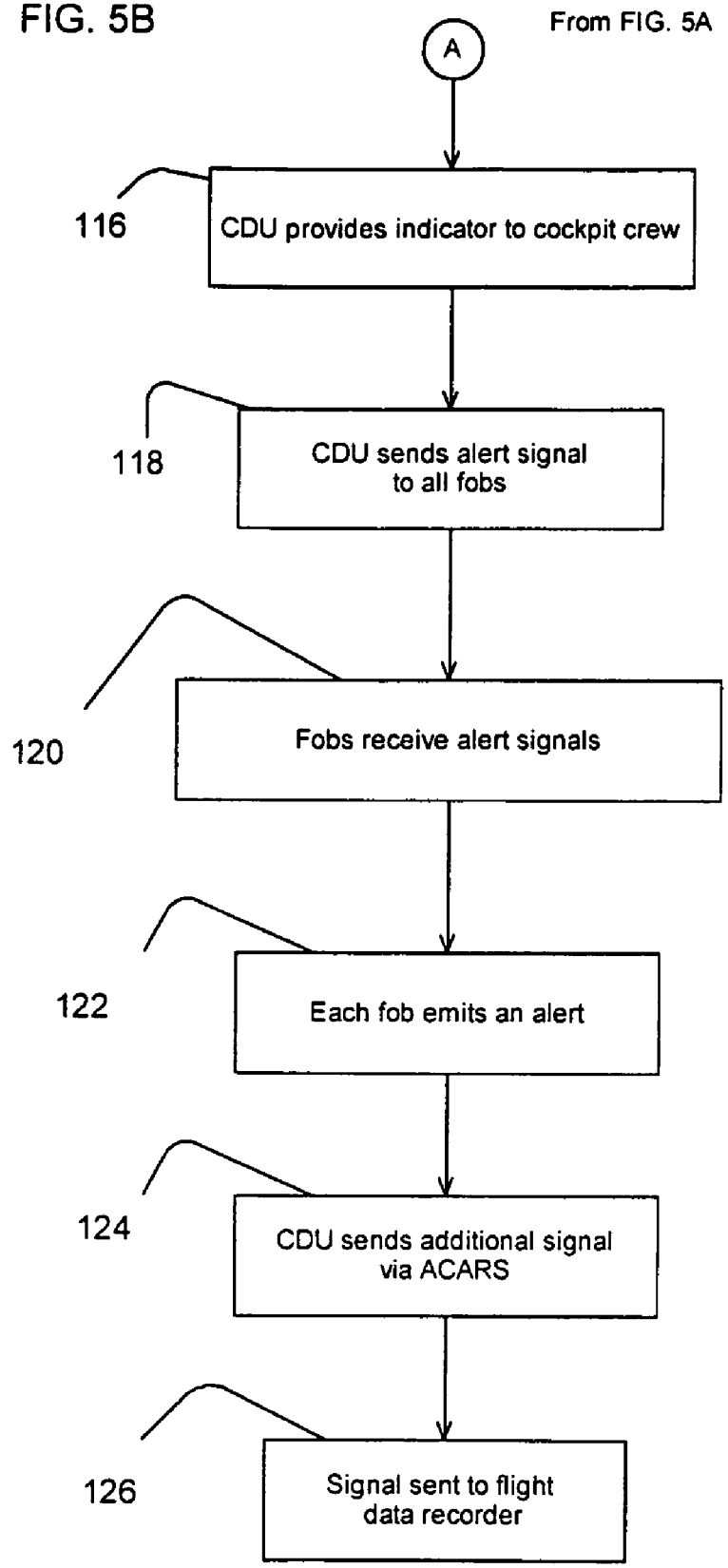

FIGS. 5A and 5B are flow charts outlining the steps for alerting all crew members of any terrorist activities on the aircraft 22 according to the teachings of the present invention. With reference to FIGS. 1–5, the steps of the method will now be explained. The method begins with step 100 where each fob 28 to be used on a flight for the aircraft 22 is initialized. The CDU is placed in the test mode by depressing the test/reset button, allowing receipt of the initialization code transmitted from each fob. The fob may be initialized with the CDU by depressing the emblem button 56 and the send button 58. The signal sent from the fob may provide data identifying the specific fob, which allows the CDU to recognize the fob as an authorized transmitter. The initialization of the fobs prevents misuse of unauthorized persons utilizing transmitters or from fob signals sent from other aircraft, thus eliminating any cross talk between closely positioned aircraft (e.g., located at adjacent gates at an airport terminal).

Next, in step 102, the fobs are carried by all flight attendants working within the cabin area 30. Preferably, each flight attendant covertly carries their assigned fob.

The method then moves to step 104 where a first flight attendant carrying an initialized fob 28 sends a first signal via the fob to the ASU 26 via the radio communications link 32. Next, in step 106, the ASU relays the received signal to the CDU via the radio communications link 34. The fob 28 may optionally include a staging feature which sends any signal transmitted from the fob in multiple repetitive signals at randomly timed spacing to the CDU, thus preventing possible blockage from other simultaneously transmitting fobs.

In step 108, it is determined by the CDU 24 whether the received signal originates from an initialized fob with a recognizable signal code. Alternatively, the ASU 26 may perform the function of determining if the received signal originates from an initialized fob with a recognizable signal code, prior to relaying the signal to the CDU. If it is determined in step 108 that the signal is not received from an initialized fob with a recognizable code, the method moves to step 110, where it is determined by the CDU if the received signal is from an initialized fob. If the signal is determined by the CDU to be from an uninitialized fob, the method moves to step 112 where the CDU provides an indicator to the cockpit crew that a signal was received from an uninitialized fob. The indicator may include an aural signal and a visual signal on the visual display 38. The visual indicator may also include a text message indicating the receipt of a signal from an uninitialized fob or jamming signal as appropriate.

However, if the CDU determines that the signal is from an initialized fob, the method moves from step 110 to step 114 where an indicator is sent to the cockpit crew that a signal was received from an initialized fob with an unrecognized code. The indicator may be an aural signal. In addition, the indicator may include a visual signal on the visual display 38 indicating that a signal was received from an initialized fob with an unrecognized code. The unrecognized code may optionally be displayed.

In addition, if it is determined by the CDU 24 that an initialized fob has sent a recognized code to the CDU, the method moves from step 108 to step 1116, where the CDU provides an indicator to the cockpit crew. The indicator may be an aural signal, such as a tone emitting from the speaker 40. Additionally, a visual signal may be displayed on the visual display 38, indicating relevant information on the signal, such as the fob number, the code, and the meaning of the code.

In step 118, the CDU or ASU may optionally send an alert signal to all fobs, indicating that an alert was sent from a crew member holding another fob. In step 120, the fob receives the alert signal. In step 122, the fob emits an alert to the flight attendant, informing the flight attendant of the alert condition on the aircraft. Preferably, the fob alerts the flight attendant by the vibrating mechanism vibrating the fob.

In step 124, the CDU may also optionally send an additional signal via the ACARS to the airline's operations center. The signal may be a replication of the indicator displayed to the cockpit crew. Next, in step 126, an optional signal may also be sent to the flight data recorder, which stores the signal received by the CDU.

Figure 6:
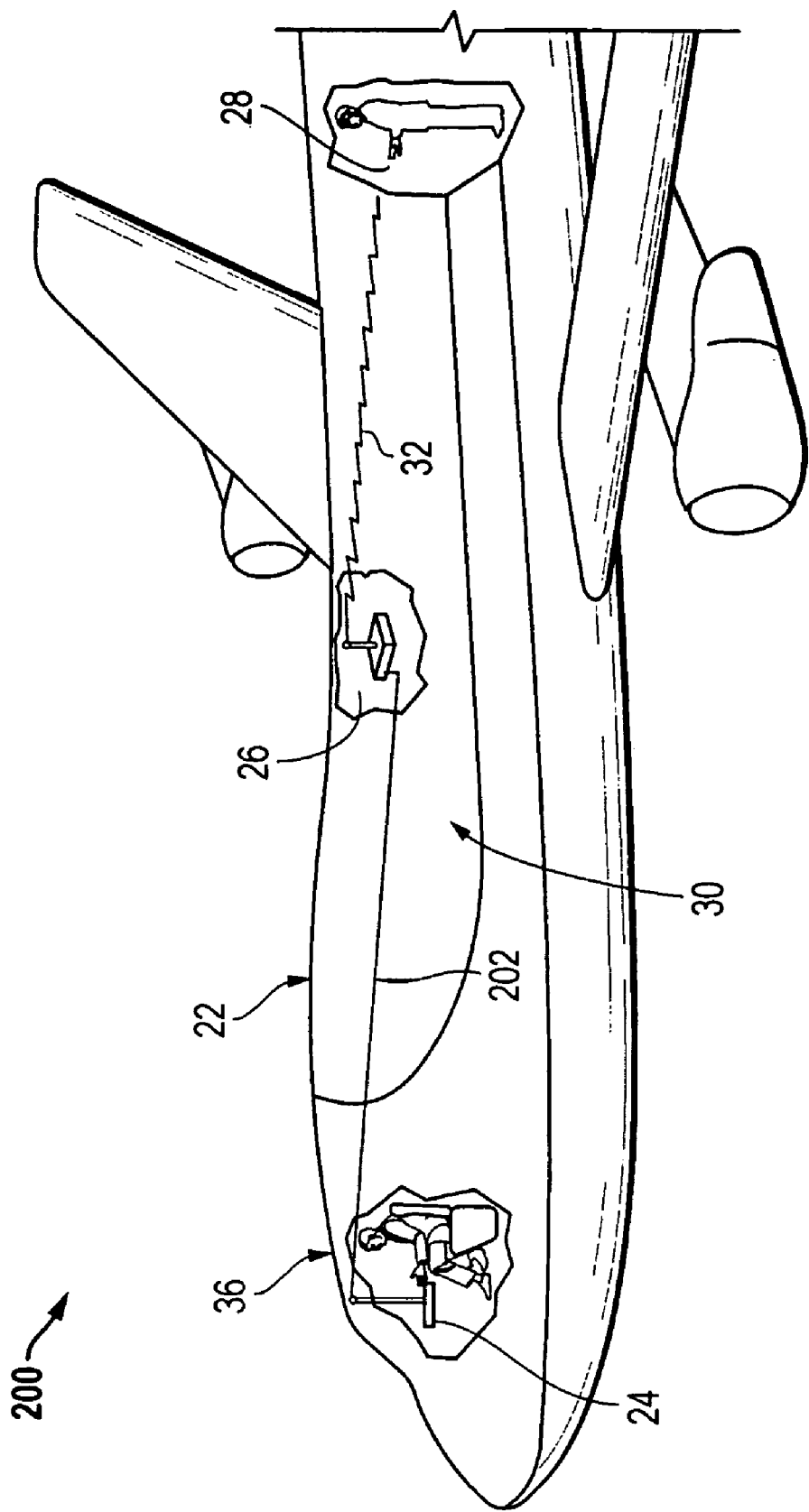
FIG. 6 is a simplified block diagram illustrating the components of an alert system in a second alternate embodiment of the present invention.

FIG. 6 is a simplified block diagram illustrating the components of an alert system 200 in an alternate embodiment of the present invention. The alert system 200 is installed within the aircraft 22 and includes the CDU 24, ASU 26, and a plurality of fobs worn by the flight attendants working within the cabin area 30 of the aircraft 22. The alert system 200 is similar to the alert system 20, with the exception that the ASU 26 is connected via a wire connection 202 to the CDU 24. The wire connection 202 enables the ASU to relay any received signals to the CDU without utilizing a radio link, which may decrease the probability of successfully jamming the frequency used to transmit the signal received from the fob. The system 200 operates in the same fashion as discussed for the alert system 20, again with the exception of the wire connection 202.

The alert systems and their associated methodology may also utilize alternate embodiments and still remain within the scope of the disclosed invention. For example, the fobs may be issued to other personnel, such as deadheading crew members, company personnel, or air marshals. In addition, although a CDU is preferably utilized as a separate unit, the CDU may be incorporated into existing cockpit instrumentation, such as the flight management computer (FMC) utilized by most modern aircraft. Also, although the discussed fobs utilize a transmitted RF signal, any signal which may be remotely transmitted to the CDU may also be employed. The fobs may be any portable device capable of transmitting a signal to the ASU or directly to the CDU. It should also be understood that the functions of the CDU (e.g., determining if an initialized fob is sending a signal or if the signal is a recognized code, etc.) may be performed within the ASU. Additionally, the functions of the ASU may be performed by the CDU.

The disclosed invention provides may advantages over existing systems and methods. The disclosed invention provides a simple, economical method of alerting both cockpit and cabin crew of any hostile acts occurring within the aircraft. Additionally, the invention alerts both the cockpit and carrier of each fob when the fob is out-of-range of the aircraft, thus preventing inadvertent removal of the fob from the aircraft.

It is thus believed that the operation and construction of the present invention will be apparent from the foregoing description. While the method and system shown and described have been characterized as being preferred, it will be readily apparent that various changes and modifications could be made therein without departing from the scope of the invention as defined in the following claims.

What is claimed is:

1. A system for alerting an aircrew of a dangerous situation occurring on an aircraft, the system comprising:
    a plurality of fobs, each fob being carried by an authorized person located on the aircraft, the fob capable of transmitting a plurality of selectable signals, each selectable signal providing specific information on the dangerous situation within the cabin area; and
    a cockpit display unit (CDU) for receiving signals sent from the transmitting fob, said CDU located within a cockpit of the aircraft and having a means for detecting an attempt to jam a frequency used by the transmitting fob to send the signal to the CDU;
    whereby one of the authorized persons carrying the fob detects a dangerous situation, selects a selectable signal from the plurality of selectable signals, and sends the selected signal from the fob to said CDU, said CDU providing an indicator to a cockpit crew and an alert signal to the plurality of fobs of the dangerous situation.

2. The system for alerting an aircrew of claim 1 further comprising an antenna sending unit (ASU) located within a cabin of the aircraft, said ASU capable of communicating with each fob, said ASU forwarding any transmitted signals to the CDU.

3. The system for alerting an aircrew of claim 1 wherein each fob is capable of transmitting a plurality of specific codes, each code correlating to a specific type of dangerous situation occurring on the aircraft.

4. The system for alerting an aircrew of claim 1 further comprising means for relaying the signal sent from the transmitting fob to ground-based personnel.

5. The system for alerting an aircrew of claim 4 wherein said means for relaying the signal includes emitting a transponder code from a transponder installed on the aircraft.

6. The system for alerting an aircrew of claim 4 wherein said means for relaying the signal includes sending an ACARS message from an ACARS unit installed on the aircraft to ground-based personnel.

7. The system for alerting an aircrew of claim 1 wherein the each fob, upon receipt of the alert signal from the CDU, provides an alert to the authorized persons.

8. The system for alerting an aircrew of claim 7 wherein the alert is a vibrating alert from a vibrating mechanism embedded within the fob.

9. A system for alerting an aircrew of a dangerous situation created by a passenger within a cabin area of an aircraft, the system comprising:
    a plurality of fobs, each fob being carried by an authorized person located on the aircraft, the fob capable of transmitting a plurality of selectable signals, each selectable signal providing specific information on the dangerous situation within the cabin area, wherein each fob includes a staging means providing multiple retransmission of the signal in a randomly timed spacing pattern; and
    a cockpit display unit (CDU) for receiving signals sent from the transmitting fob, said CDU located within a cockpit of the aircraft;
    whereby one of the authorized persons carrying the fob detects a dangerous situation created by a passenger within the cabin area, selects a selectable signal from the plurality of selectable signals and sends the selected signal from the fob to said CDU, said CDU providing an indicator to a cockpit crew of the dangerous situation and an alert signal to each fob, each fob providing an alert to each authorized person carrying the fob.

10. The system far alerting an aircrew of claim 9 wherein the CDU sends a test signal to each fob.

11. The system for alerting an aircrew of claim 10 wherein a fob provides an alert when the test signal is not received by the fob after a predetermined time interval.

12. The system for alerting an aircrew of claim 11 wherein the test signal has a signal strength providing reception by each fob for a specified distance and wherein when the fob is carded beyond the specified distance, the alert provides an out-of-range indicator to the authorized person carrying the fob.

13. The system for alerting an aircrew of claim 10 wherein the fob returns a status signal to the CDU providing information on the status of the fob.

14. A method of alerting an aircrew located in an aircraft of a dangerous activity on the aircraft, said method comprising the steps of:
    initializing a plurality of fobs to allow a cockpit display unit (CDU) located within a cockpit of the aircraft to recognize any signals transmitted by each initialized fob;
    carrying at least one fob by a flight crew member during flight of the aircraft, the fob capable of transmitting a plurality of selectable signals, each selectable signal providing specific information on the dangerous situation within the cabin area;
    wherein each fob includes a staging means providing multiple retransmission of the signal in a randomly timed spacing pattern;
    selecting a selectable signal from the plurality of selectable signals by the flight crew member;
    transmitting the selected signal from the fob to the CDU, said signal being sent by the flight crew member when detecting a dangerous activity occurring aboard the aircraft;
    displaying an indication on the CDU to the cockpit crew that a signal was sent from the fob;
    broadcasting an alert signal to all the fobs to indicate tat a dangerous activity has occurred aboard the aircraft.

15. The method of alerting an aircrew of claim 14 wherein the step of transmitting a signal to the CDU includes the steps of:
    transmitting the selected signal from the fob to an antenna sending unit (ASU) located on the aircraft; and
    relaying, by the ASU, the signal to the CDU.

16. The method of alerting an aircrew of claim 15 further comprising the steps of:
    sending a test signal from the ASU to each fob to query the status of the fobs;
    responding by each fob wit a status of the fob to the ASU.

17. The method of alerting an aircrew of claim 15 further comprising the steps of:
    sending a test signal from the ASU to each fob to query the status of the fobs;
    emitting an alert by each fob after exceeding a specified time period without receiving a test signal.

* * * * *